Oct. 18, 1966     C. I. WILLIAMS     3,279,757
ADJUSTABLE BEARING MEMBER
Filed May 4, 1964
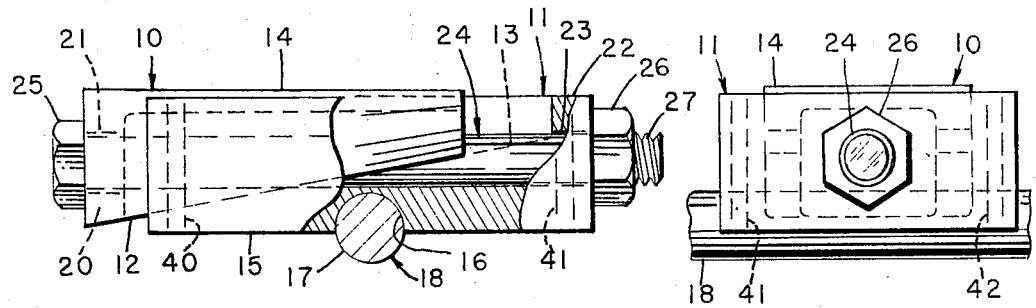
FIG. 1
FIG. 2
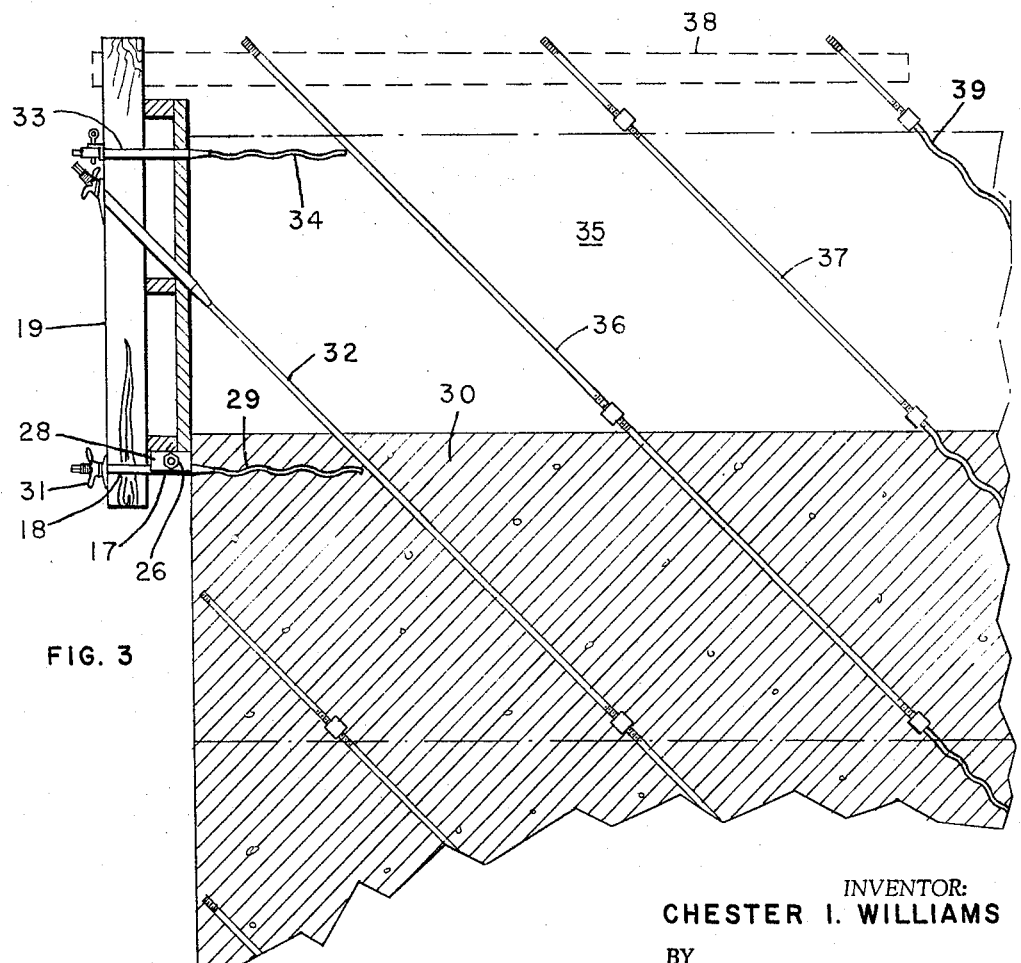
FIG. 3
INVENTOR:
CHESTER I. WILLIAMS
BY
Atty.

United States Patent Office 3,279,757
Patented Oct. 18, 1966

3,279,757
ADJUSTABLE BEARING MEMBER
Chester I. Williams, 347 Greenbriar SE.,
Grand Rapids, Mich.
Filed May 4, 1964, Ser. No. 364,696
3 Claims. (Cl. 254—104)

This invention provides an adjustable bearing member, and has been developed primarily as an element used in connection with the securing of casting forms in the pouring of concrete. It is conventional practice to develop large concrete structures in a series of successive "pours," and to imbed anchoring devices in the concrete as it is poured for use in securing the forms for subsequent pours. The usual form is a large panel structure that normally rests on a series of bolts secured to anchors in concrete that has set sufficiently to withstand the forces involved. These bolts not only support the vertical weight of the forms, but tie the forms securely in place so that the tremendous pressure of the liquid concrete can be resisted.

A series of these anchoring devices cannot possibly be located with sufficient accuracy to dispose all of them along an exactly straight line. In addition to the problem of alignment, the manner of construction used for the forms themselves precludes any severe requirements for precision. It therefore becomes necessary to assure in some manner that the weight of the form is fairly evenly distributed across the series of anchoring devices, this being done to avoid excessive localized stresses, and also to secure the proper adjusted position of the form. It has been the general practice to apply shims of varying description between the projecting portions of the securing bolts and the underside of the forms, but this is a time-consuming procedure. A rather cumbersome assortment of shims must be kept available if any substantial degree of vertical adjustability of the forms is to be made. This invention eliminates the need for such make-shift arrangements, and provides a device that is capable of adjustment to transfer the weight of the form to the securing bolt with a very considerable range of adjustability. In principle, the device includes a pair of overlapped wedge members resting preferably on top of the supporting bolt, and capable of relative sliding movement to alter the distance from the bolt of the surface on which the form is to rest. In the preferred form of the invention, a threaded adjusting bolt is used to control the relative position of the wedge members, providing a tremendous mechanical advantage for handling the weight which the device is to position. This arrangement also gives a degree of permanence to the adjustment that is not subject to vibration or unforeseen mishap.

The several features of the invention will be analyzed in further detail through a discussion of the particular embodiment illustrated in the accompanying drawing. In the drawing:

FIGURE 1 is a view in partial section on a plane perpendicular to the axis of a securing bolt, and showing the adjustable bearing member.

FIGURE 2 is an end view of the device shown in FIGURE 1.

FIGURE 3 is a schematic view showing the manner in which the bearing member is used in the support of a casting form in the pouring of concrete.

Referring to the drawing, the adjustable bearing device includes the overlapped wedge members 10 and 11, these being in sliding engagement. The member 10 is substantially U-shaped in cross-section, and is received within the similarly-shaped cross-section of the member 11, these members being in inverted relationship. This embracing relationship provides a guideway establishing the path of relative sliding movement of these members. The slanted surfaces 12 of the member 10 co-act with the surfaces 13 on the member 11 to produce a variation in the dimension between the parallel surfaces 14 (on the member 10) and 15 (on the member 11). The member 15 has a transverse groove 16 receiving the projecting portion 17 of a securing bolt 18, and relative sliding movement of the members 10 and 11 will serve to alter the distance from the axis of the securing bolt 18 to the supporting surface 14 on which the form structure 19 rests. The groove 16 is preferable to a hole, as it provides for lateral installation. Any form of locating recess will function, however.

The member 10 has an end flange 20 provided with an opening 21, and the member 11 has a similar end flange 22 provided with the opening 23. These openings are traversed with considerable clearance by the adjusting bolt 24 having the head 25, and also having the nut 26 engaging the threaded end 27. Relative rotation between the nut 26 and the bolt 24 will adjust and maintain the relative position of the bearing members 10 and 11 along the slanted surfaces 12 and 13. The clearance between the bolt 24 and the openings 21 and 23 permits the necessary angular displacement of the axis of the bolt 24 with respect to the members 10 and 11 as the nut 26 is adjusted.

The device shown in FIGURES 1 and 2 is indicated at 28 in FIGURE 3. The securing bolt 18 is connected to the anchoring device 29 imbedded in the pour 30 of concrete, and tightening the wing nut 31 will secure the bottom of the form 19. The upper portion of the form is supported by forces applied through the extension 32 from anchoring devices imbedded in older pours, in a manner described in claims in my application Serial No. 91,255, filed on February 23, 1961, now Patent No. 3,152,198. It is conventional practice to use a temporary "shebolt" 33 to support the anchoring device 34 which will be imbedded in the pour to occupy the space indicated at 35. The extension rods 36 and 37 will be used in successive pours, and a temporary beam as shown at 38 will normally be used to support a remote anchoring device 39 for engagement with the pour 35. The number of interrelated components used in supporting these forms and in positioning anchoring devices will serve to emphasize the importance of accurate alignment of the form 19. The function of the adjustable bearing device 28 (shown in FIGURES 1 and 2) simplifies many of the problems encountered in this work.

The installation of the illustrated modification of the bearing device 28 can be accomplished either as a separate operation, or by securing it to the forms by nails partially driven through the holes 40–42 in the member 11. Sufficient clearance should be allowed under the heads of such nails to accommodate the desired degree of adjustability. The open groove 16 permits the unit to engage the securing bolt 18 from the side as the form is lowered into position, while the loose nails retain the device in association with the form in the proper location. Where the groove 16 is replaced by a hole, the bearing device would be slipped over the securing bolt prior to placement of the form.

The particular embodiments of the present invention which have been illustrated and discussed herein are for illustrative purposes only, and are not to be considered as a limitation upon the scope of the appended claims.

I claim:
1. In combination with a supporting structure, a securing bolt extending from said supporting structure, and a casting form, an adjustable bearing device, comprising:
   first and second wedge members in slidable engagement and interposed between said securing bolt and said form, said members having normally interengaged guideway means determining the path of relative sliding movement of said members, said members having transverse flanges at the remote corresponding ends thereof provided with apertures, and one of said members having a transverse groove receiving said bolt in closely fitting relationship; and an adjusting bolt traversing said holes and operative to move said members in overlapping relationship, and thereby adjust the support of said form.

2. A device as defined in claim 1, wherein said wedge members are U-shaped in cross-section, one received within the other in inverted relationship.

3. A device as defined in claim 1, wherein said transverse groove is in the form of a central groove.

References Cited by the Examiner

UNITED STATES PATENTS

| 464,921 | 12/1891 | Carr | 254—104 |
| 1,045,984 | 12/1912 | King | 254—104 |
| 2,248,715 | 7/1941 | Mafera | 254—104 |

WILLIAM FELDMAN, *Primary Examiner.*

OTHELL M. SIMPSON, *Examiner.*